(12) United States Patent
Iyengar et al.

(10) Patent No.: US 9,400,653 B2
(45) Date of Patent: Jul. 26, 2016

(54) SYSTEM AND METHOD TO CLEAR AND REBUILD DEPENDENCIES

(71) Applicants: Ravi Iyengar, Austin, TX (US); Sandeep Kumar Dubey, Austin, TX (US)

(72) Inventors: Ravi Iyengar, Austin, TX (US); Sandeep Kumar Dubey, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 631 days.

(21) Appl. No.: 13/831,434

(22) Filed: Mar. 14, 2013

(65) Prior Publication Data

US 2014/0281404 A1      Sep. 18, 2014

(51) Int. Cl.
*G06F 9/30*     (2006.01)
*G06F 9/38*     (2006.01)
*G06F 9/00*     (2006.01)

(52) U.S. Cl.
CPC .......... *G06F 9/30145* (2013.01); *G06F 9/3838* (2013.01); *G06F 9/3842* (2013.01); *G06F 9/3859* (2013.01)

(58) Field of Classification Search
None
See application file for complete search history.

(56) References Cited

U.S. PATENT DOCUMENTS

| | | | |
|---|---|---|---|
| 6,065,105 A | 5/2000 | Zaidi et al. | |
| 6,334,182 B2 | 12/2001 | Merchant et al. | |
| 6,557,095 B1 | 4/2003 | Henstrom | |
| 6,877,086 B1 | 4/2005 | Boggs et al. | |
| 6,981,129 B1 | 12/2005 | Boggs et al. | |
| 8,099,582 B2 | 1/2012 | Abernathy et al. | |
| 8,291,431 B2 | 10/2012 | Du et al. | |
| 2007/0043932 A1 | 2/2007 | Kulkarni et al. | |
| 2012/0023314 A1 | 1/2012 | Crum et al. | |
| 2013/0247058 A1* | 9/2013 | Sirdey ...................... | G06F 9/46 718/102 |

* cited by examiner

*Primary Examiner* — Scott Sun
(74) *Attorney, Agent, or Firm* — Renaissance IP Law Group LLP (57) ABSTRACT

A data processing system and method of clearing and rebuilding dependencies, the data processing method including changing a counter associated with a first entry in response to selecting a second entry; comparing the counter with a threshold; and indicating that the first entry is ready to be selected in response to comparing the counter with the threshold; wherein the first entry is dependent on the second entry.

21 Claims, 6 Drawing Sheets

SYSTEM AND METHOD TO CLEAR AND REBUILD DEPENDENCIES

BACKGROUND

This disclosure relates to systems and methods to clear and rebuild dependencies in electronic applications and, in particular to systems and methods to clear and rebuild dependencies within processors, such as in a scheduler, buffer, or other memory structure.

Current processors allow speculative instructions to speculatively clear dependencies for dependent instructions. Clearing the dependencies is performed, for instance, by clearing a dependency bit corresponding to the speculative instruction in a dependency vector of a dependent instruction. However, as the execution of the instruction was only speculative, various events, such as load misses, faults, hazards, and the like, may cause the execution of a speculative instruction to be cancelled. In this case, the dependency vectors of the dependent instructions must be rebuilt to recreate the cleared dependencies. Unfortunately, this can require a complex process of re-comparing source tags against the cancelled destination tags and setting the dependency bits again. This rebuilding process can be costly both in terms of processor resources and power.

DETAILED DESCRIPTION

The various embodiments disclosed herein relate primarily to clearing and rebuilding dependencies, such as clearing and rebuilding dependencies of instructions in processors. This may include, for instance, but is not limited to, producer and dependent instructions in a scheduler. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations.

However, the methods and systems will operate effectively in other implementations. Phrases such as "exemplary embodiment", "one embodiment", "another embodiment", or the like may refer to the same or different embodiments as well as to multiple embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. Furthermore, in those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Figure 1:
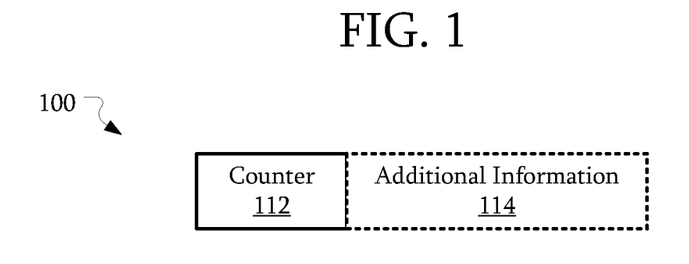
FIG. 1 is a block diagram illustrating an entry, such as a scheduler entry, for instance, according to an embodiment incorporating principles of the present inventive concepts.

FIG. 1 is a block diagram illustrating an entry 100 according to an embodiment incorporating principles of the present inventive concepts. In this embodiment, the entry 100 includes a counter 112. The entry may, for instance, be a producer 301, 302 and/or dependent entry 306 stored in a memory table such as a scheduler or other buffer (see FIG. 3). However, the entry 100 and counter 112 may be any of a number of different entries implemented in a variety of ways. For example, the entry 100 may be stored in a memory, such as in a scheduler or other buffer, along with other similar entries 100. In another embodiment, the counter 112 may be a register associated with the entry 100. The entry 100 may also include additional information 114. The additional information 114 may include information such as an instruction or instructions, registers, a dependency vector, or the like. The additional information 114 may or may not be stored with the counter 112 associated with the entry 100. For instance, the additional information 114 may be stored in a buffer separate from the counter 112.

Figure 2:
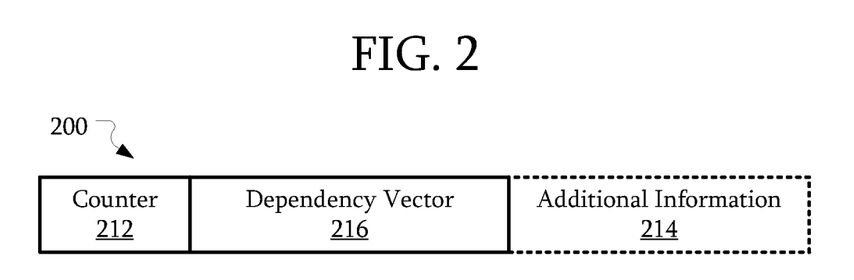
FIG. 2 is a block diagram illustrating an entry according to another embodiment incorporating principles of the present inventive concepts.

FIG. 2 is a block diagram illustrating an entry according to another embodiment incorporating principles of the present inventive concepts. In this embodiment, the entry 200 can include a counter 212, a dependency vector 216, and additional information 214. The entry 200 may, for instance, be a dependent entry 306 stored in a memory table such as a scheduler or other buffer (see FIG. 3). The dependency vector 216 preferably indicates a relationship between the entry 200 and zero or more other entries. For example, the dependency vector 216 may indicate other entries (such as producer entries 301, 302 (see FIG. 3)) on which the entry 200 depends. In another embodiment, however, the entry 200 may, for instance, be a producer entry and the dependency vector 216 may indicate other entries that depend on the entry 200.

The dependency vector 216 may be represented in a variety of ways. For example, the dependency vector 216 may include a series of bits, each of which corresponds to a particular entry. A set bit in a particular location would indicate that the entry 200 is dependent on the entry stored at the memory location represented by that bit. In another example, the dependency vector 216 may include references to registers, data, or the like upon which the entry 200 depends. Any number of additional ways of constructing a dependency vector will be apparent to those skilled in the art.

Figure 3:
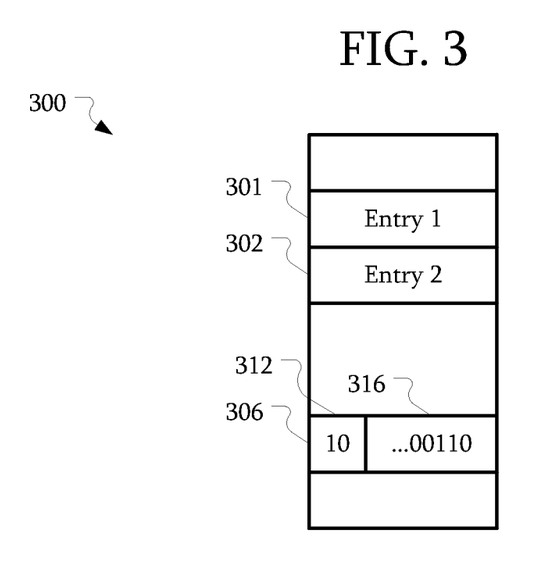
FIG. 3 is a block diagram illustrating a memory including multiple entries (such as producer entries) and a dependent instruction according to an embodiment incorporating principles of the present inventive concepts.

FIG. 3 is a block diagram schematically illustrating a memory including entries according to an embodiment incorporating principles of the present inventive concepts. Referring to FIG. 3, in this embodiment, a memory 300 is configured to store multiple entries. Although entries 301, 302, and 306 are enumerated, other entries may be present in the memory 300, but have been omitted for clarity. The entries 301, 302, and 306 may be similar to the entry 200 described above. For instance, the entries 301 and 302 may be producer entries, and the entry 306 may be a dependent entry which depends on both of those producer entries 301, 302. The memory structure 300 may be a scheduler or other buffer. Although not illustrated, he producer entries 301, 302 may, but need not contain counters 212 or dependency vectors 216 similar to entry 306.

In this example, entry 306 is a dependent entry which depends upon multiple other entries 301, 302. Here, the entry 306 includes a counter 312 where the value of the counter 312 can be loaded with a binary number indicating a total number of entries upon which the entry 306 depends. In this case, the counter 312 is set to a value of 2 ($10_2$), indicating that the entry 306 depends on two other entries 301, 302.

Additionally, in this embodiment, the dependency vector 316 includes a number of bits equal to a number of potential entries in the memory 300. Each bit corresponds to one of the entries. A set bit indicates that the entry 306 is dependent on the entry located at the memory location corresponding to that bit. For example, in this example, the dependency vector 316 value is set to $110_2$. If the number of potential entries in the memory 300 is 16, the width of the dependency vector may be 16. Thus, the dependency vector 316 may be $0000000000000110_2$. For simplicity in FIG. 3, the zeros in the more significant bits are not illustrated. As bits 1 and 2 of the dependency vector 316 are set, this dependency vector 316 indicates that entry 306 is dependent on entry 301 and entry 302. If the entry 306 was dependent on other entries, those corresponding bits of the dependency vector 316 would also be set.

As described above, the value of the counter 312 can be set to the number of entries upon which the entry 306 depends. For example, in one embodiment, each entry 301 and 302 may have only one destination. Thus, the number of destinations on which entry 306 depends is the same as the number of entries. However, in another embodiment, the value of the counter 312 can be set to the number of destinations upon which the entry 306 depends. As will be described in further detail below, each entry 301 and 302 may have one or more destinations. The value of the counter 312 can be set to a total number of unique destinations on which the entry 306 depends.

As will be described in further detail below, the clearing and rebuilding of dependencies may be readily performed by decrementing and incrementing the counter 312 without the need for clearing bits in the dependency vector 316. Although in some embodiments, the dependency bit of the dependency vector 316 for an entry that is selected may be cleared, in other embodiments the dependency bit may remain set. That is, the dependency vector 316 need not be modified when clearing or rebuilding dependencies. In an embodiment constructed according to principles of the present inventive concepts, clearing a dependency can be performed simply by decrementing the counter and rebuilding the dependency can be performed by simply incrementing the counter. Accordingly, a system and method for clearing and rebuilding dependencies according to principles of the present inventive concepts may have a significantly decreased complexity and a decreased cost in terms of area and power.

According to an embodiment, when generating the value of the counter 312, the value may be generated by a pop-count of the dependency bits in the dependency vector 316. For example, the number of set bits (e.g., ones) in the dependency vector 316 may be counted. In the example of FIG. 3, the two ones in the dependency vector 316 result in a counter 312 value of $10_2$.

The counter 312 can be provided having a width that is sufficient to store a value that is greater than or equal to a maximum number of entries. For example, if a memory 300 has a depth of 16. and the system includes a total of four such memories 300 constructed such that a single entry 306 may depend upon any entry from any of the memories 300, then the maximum number of entries a single entry can depend on is 63, not including itself. A counter 312 having a width of six bits or greater may be used in this example to provide sufficient width to count the maximum total number of dependencies.

In another embodiment, the counter 312 may have a width that is greater than or equal to a minimum number of bits needed to represent a maximum number of entries upon which the entry 312 may depend. For example, where a number of entries upon which a given entry may depend is limited to 2, a counter 312 with a reduced width can be used. In such a case, a counter 312 width of two bits is able to store a maximum count of 2 and may be used. In other words, when, regardless of the number of potential dependencies, the maximum number of dependencies for a given entry is 2, a counter 312 having a width of 2 may be used.

In another embodiment incorporating principles of the present inventive concepts, the value of the counter 316 can be generated by logical operations rather than counting of bits of the dependency vector 316. Using the example of a maximum of 2 dependencies, an OR operation and an exclusive-OR (XOR) operation can be used to generate the bits of the counter. For example, the XOR operation of the bits of the dependency vector 316 will generate a 1 if only one dependency bit is set. If the result of the XOR operation is 0, the OR operation can then be used to determine if the number of dependency bits is 0 or 2. A 0 result of the OR operation indicates that zero dependency bits are set while a 1 indicates that two bits are set. Here, the XOR result may form the least-significant-bit (LSB) of the counter 312 and a combination of the XOR result and OR result may form the most-significant-bit (MSB) of the counter 312. Equations 1 and 2 illustrate an example of the functions which may be used to create the MSB and LSB of the counter 312 where X is the XOR result and O is the OR result.

$$LSB = X \quad (1)$$

$$MSB = O\overline{X} \quad (2)$$

Although some examples of logic to create the bits of the counter where the maximum number of dependencies is two have been described above, logical operations can be used to generate the counter 312 value for any number of dependencies, including those needing more than two bits to store the maximum number of dependencies. Accordingly, counters to count the number of dependency bits and the corresponding delay of such counters can be reduced if not eliminated.

Although a dependency vector 316 has been described above which references entries of the memory 300, it should be understood that the dependency vector 316 can reference other memories, tables, queues, or the like containing entries, data, instructions, operations, or the like upon which the entry 306 depends. In addition, although the dependency vector 316 has been described as having a particular form, the dependency vector 316 may take any of a number of other forms. For example, the dependency vector 316 may include references to registers, instructions, entries, data, caches, or the like. In addition, although the dependency vector 316 and the counter 312 have been described as tracking an entry-level granularity, any level of granularity may be used. For example, a register-level granularity may be used where the counter 312 tracks the number of registers upon which the entry 306 depends. A single entry 301 may be associated with multiple registers on which the entry 306 depends. Thus, the single entry 301 may result in an increase in the counter 312 value that is greater than 1.

According to various principles of the present inventive concepts, regardless of the form of the dependency vector 316, the dependency vector 316 need not be cleared, set, or otherwise modified as dependencies are cleared and rebuilt. That is, the tracking of resolved and unresolved dependencies using the counter 312 supplants the need to modify the dependency vector 316 itself.

Figure 4:
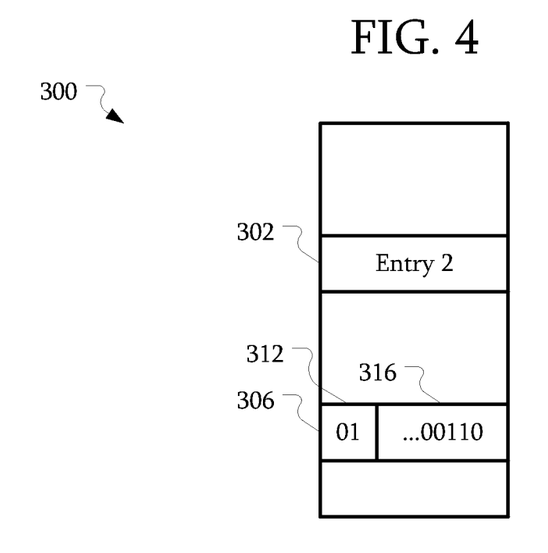
FIG. 4 is a block diagram of the memory of FIG. 3 illustrating the modification of a count value for a dependent instruction after an entry on which the dependent instruction depends has been speculatively selected.

FIGS. 4-8 illustrate an example of decrementing and incrementing the counter 312 of FIG. 3 according to an embodiment incorporating principles of the present inventive concepts. Referring first to FIG. 4, FIG. 4 illustrates the memory of FIG. 3 after an entry 301 upon which the dependent entry 306 depends has been speculatively selected. As used herein, the term "selected," or "selecting" can refer to part of a process to remove an entry from the memory 300. For example, selecting may include picking the entry 301 for execution, where the entry 301 is an instruction in a processor pipeline (e.g., a scheduler). The entry 301 may, but need not be immediately removed from the memory 300 in response to the selection.

In response to selecting the entry 301, the counter 312 is changed to indicate the reduction in the number of dependencies. Here the counter 312 is decremented in response to selecting the entry 301 to indicate one fewer dependencies. Significantly, however, the dependency vector 316 is not changed. That is, the bit for entry 301 was not cleared so that the dependency vector 316 itself remains unaltered.

After the counter 312 has been changed, the counter 312 may be compared with a threshold to determine if the dependencies of the entry 306 are cleared. If the comparison of the counter 312 to the threshold indicates that the dependencies are cleared, the entry 306 may be indicated as being ready to be selected. For example, the threshold may be zero, i.e., indicating that there are zero dependencies remaining. In this example, since the counter 312 in FIG. 4 is not zero, the entry 306 is not ready to be selected. More particularly, since entry 302, upon which entry 306 additionally depends, has not yet been selected, the dependent entry 306 is not yet ready for selection.

Figure 5:
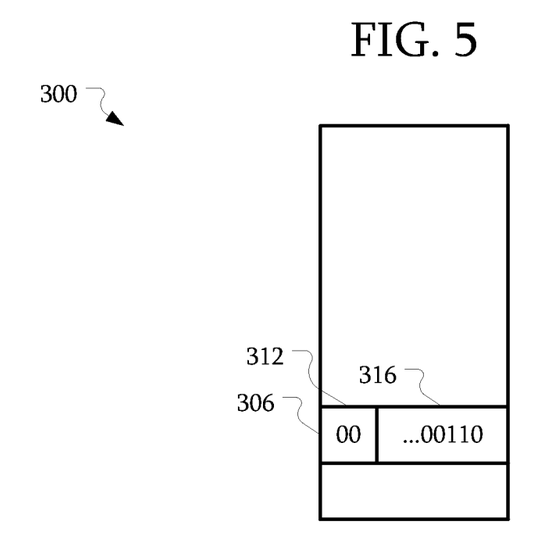
FIG. 5 is a block diagram of the memory of FIGS. 3 and 4 illustrating the modification of the dependent instruction's count value after another entry on which the dependent instruction depends has been speculatively selected.

Referring now to FIG. 5, FIG. 5 illustrates the memory of FIG. 4 after the second entry 302 upon which the dependent entry 306 has been selected. Similar to the operations described with respect to FIG. 4, the counter 312 is again decremented in response to selecting entry 302. Because decrementing the counter 312 results in a value of zero, which equals the threshold value in this example, the entry 306 is ready to be selected.

Although an explicit comparison to a threshold of zero has been described above, an explicit comparison need not be performed. For example, the counter 312 may be configured to set a zero flag when the counter 312 reaches zero. The entry 306 may be indicated as being ready to be selected in response to the zero flag.

As described above, the entry 306 is ready to be selected without clearing the entries of the dependency vector 316. That is, the dependency vector 316 in the initial stage illustrated in FIG. 4 is identical or substantially identical to the dependency vector 316 in FIGS. 3 and 5. Only the counter 312 was changed, not the dependency vector 316.

Figure 6:
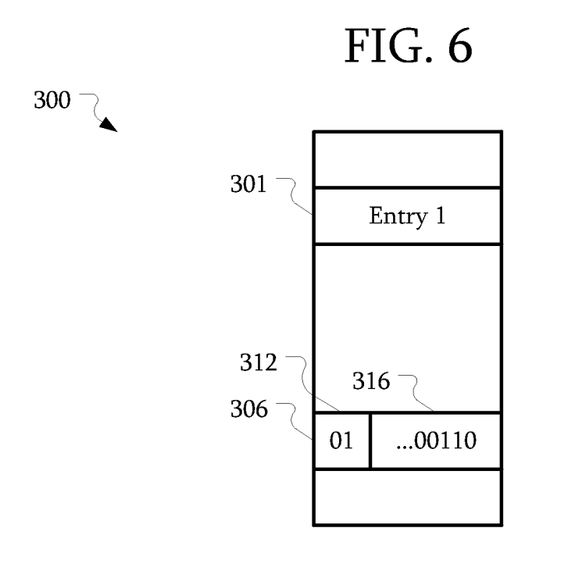
FIG. 6 is a block diagram of the memory of FIGS. 3, 4, and 5 illustrating the modification of the dependent instruction's count value after an entry on which the dependent instruction depends has been cancelled (i.e., due to cancellation of the speculative entry selection).

Rebuilding dependencies will now be discussed with reference to FIGS. 6 through 8. Referring now to FIG. 6, FIG. 6 illustrates the memory of FIG. 5 after an entry 301 has been cancelled. As used herein, cancelling may include stopping an operation associated with the entry 301 before the operation has been completed. For example, if entry 301 was an instruction, the entry 301 may be cancelled for a variety of reasons, such as a load miss, a fault, a hazard, or the like. As shown in FIG. 6, the counter 312 may be changed in response to cancelling the entry 301 on which the entry 306 depended to the memory 300. Here, the counter 312 is incremented by 1.

Figure 7:
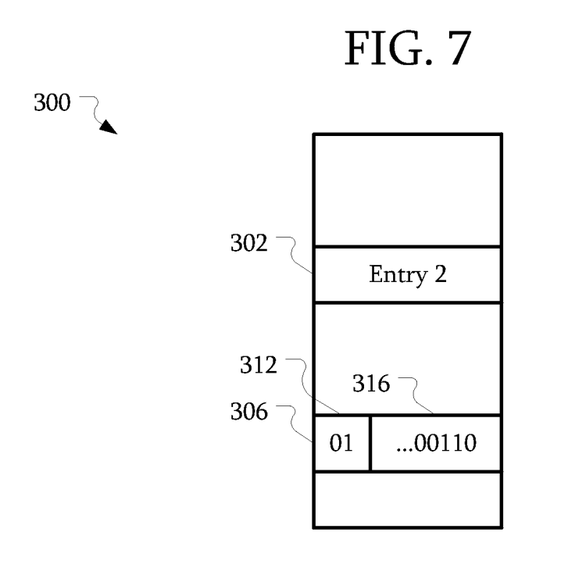
FIG. 7 is a block diagram of the memory of FIGS. 3, 4, and 5 illustrating the modification of the dependent instruction's count value after a different entry on which the dependent instruction depends has been cancelled.

Referring now to FIG. 7, FIG. 7 illustrates the memory of FIG. 5 after a different entry 302 has been cancelled. Even though a different entry 302 from that shown in FIG. 6 is cancelled, the counter 312 is still incremented by one to indicate that one of the speculatively cleared dependencies has been cancelled. Accordingly, regardless of which entry is cancelled, the changes to the dependent entry 306 can be substantially identical when cancelling any single entry.

According to principles of the present inventive concepts, the identity of the entry that was cancelled need not be recorded. In other words, the counter 312 can track the number of remaining dependencies, but need not maintain information on which particular dependencies remain. Since all dependencies must be cleared before the entry 306 may be selected, this provides an efficient way of determining when the entry 306 is ready to be selected without creating the difficulties associated with clearing bits of the dependency vector 316.

Figure 8:
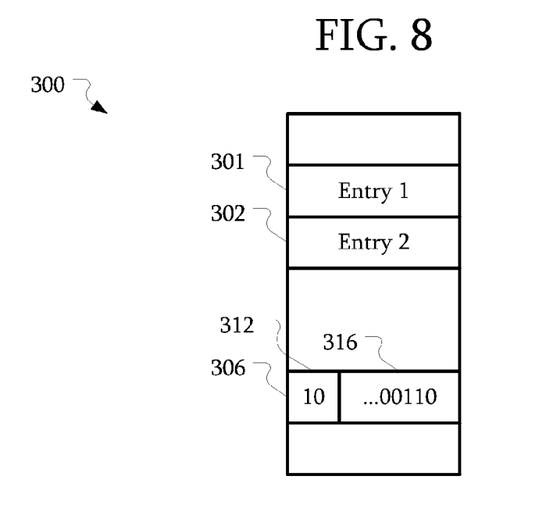
FIG. 8 is a block diagram of the memory of FIGS. 3, 4, and 5 illustrating modification of the dependent instruction's count value after multiple entries on which the dependent instruction depend have been cancelled.

Referring now to FIG. 8, FIG. 8 illustrates the memory of FIG. 5 after both producer entries 301, 302 have been cancelled. For example, entry 301 can be cancelled after entry 302 is cancelled (see FIG. 7) or entry 302 can be cancelled after entry 301 is cancelled (see FIG. 6). Regardless of which entry is cancelled first, each cancellation of an entry on which entry 306 depends causes the counter 312 to increment by an additional count value. In this case, since both entries 301 and 302 on which entry 306 depends were cancelled, the counter 312 has been incremented back to its original value of 2.

The memory 300 of FIG. 8 may also result from multiple entries being cancelled substantially simultaneously. For example, the memory 300 may be in a state as illustrated in FIG. 5. If both entry 301 and entry 302 are cancelled substantially simultaneously, the counter 312 can be incremented by two in response. That is, the counter 312 can be incremented by the number of entries that are cancelled regardless of timing or order. As a result, the value of the counter 312 still tracks the unresolved dependencies of the entry 306.

As described above, entries may be selected and cancelled. According to principles of the present inventive concepts, rebuilding of the dependency vector 316 is not required as the dependency bits were not cleared. Rather, the counter 312 was decremented and incremented as entries on which entry 306 depends were selected and cancelled.

Although incrementing and decrementing the counter 312 have been described above as the mechanism for tracking dependencies, the direction of changing the counter 312 may be different. For example, in an embodiment, the counter 312 may be loaded with a negative number, such as −2 for entries 301 and 302, and appropriately encoded in the counter 312 as a signed number. The counter 312 may be incremented as entries are selected and decremented as entries are cancelled. Once the counter 312 reaches a threshold of zero, the entry 306 can be indicated as being ready to be selected.

Also, although zero has been used as a threshold, other values can be used as thresholds. For example, in an embodiment, the counter 312 may be initially set to zero and the threshold can be set to the number of dependencies of the entry 306. The counter 312 may be incremented as entries are selected and decremented as entries are cancelled. For example, in the embodiment described previously having 2 dependencies, the threshold may be set to 2. Once the counter 312 value reaches 2, the entry 306 can be indicated as being ready to be selected.

Although one memory 300 has been used as example, any number of memories 300 may be used. Moreover, the memories 300 need not be part of identical functions. For example, one or more memories 300 may be part of multiple instruction schedulers while one or more other memories 300 may be part of a replay queue. Furthermore, any entry may be dependent on entries across any of the memories 300. In addition, cancelling an entry may, but need not result in leaving the entry to its original memory 300. For example, an instruction from a memory 300 for a scheduler may be moved to another memory 300 for a replay queue.

Figure 9:
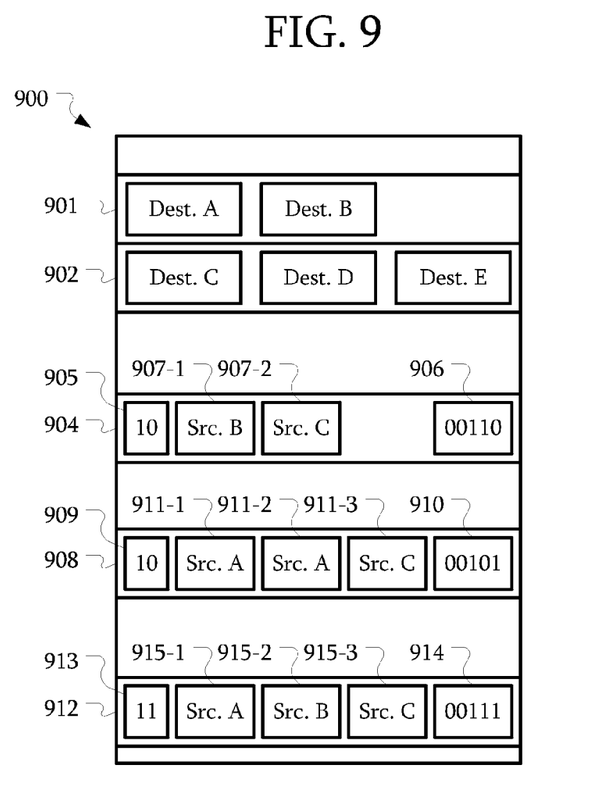
FIG. 9 is a block diagram illustrating a memory including multiple entries with multiple destinations and multiple examples of dependent entries according to an embodiment incorporating principles of the present inventive concepts.

FIG. 9 is a block diagram illustrating a memory 900 including multiple entries with multiple destinations and multiple examples of dependent entries according to an embodiment incorporating principles of the present inventive concepts. In this embodiment, entry 901 includes destinations A and B. Entry 902 includes destinations C, D, and E.

In this embodiment, the dependency vectors 906, 910, and 914 include bits corresponding to destinations. Here, beginning at the LSB, the bits correspond to destinations A, B, C, D, and E. Other destinations may be present; however, for simplicity, only the bits for destinations A-E are illustrated. In other embodiments, the dependency vector may be represented in other ways as described above.

Entries 904, 908, and 912 are dependent on entries 901 and 902. In particular, entries 904, 908, and 912 each have sources that are dependent on destinations of the entries 901 and 902. Entry 904 includes sources 907-1 and 907-2. Source 907-1 depends on destination B while source 907-2 depends on destination C. Here, the dependency vector 906 of $00110_2$ indicates that entry 904 depends on destinations B and C. The counter 905 is set to the number of destinations on which the entry 904 depends. Here, the counter 905 is set to $10_2$ as the entry 904 is dependent on two different destinations.

Entry 908 includes sources 911-1, 911-2, and 911-3. Sources 911-1 and 911-2 each depend on destination A, while source 911-3 depends on destination C. Here, the dependency vector 910 of $00101_2$ indicates that entry 908 depend on destinations A and C. The counter 909 is set to the number of destinations on which the entry 908 depends. Here, the counter 909 is set to $10_2$ as the entry 908 is dependent on two different destinations, destination A and destination C. Note that even though entry 908 includes three sources 911, the entry 908 only depends on two different destinations.

Entry 912 includes sources 915-1, 915-2, and 915-3. Source 915-1 depends on destination A, source 915-2 depends on destination B, and source 915-3 depends on destination C. Here, the dependency vector 914 of $00111_2$ indicates that entry 912 depends on destinations A, B, and C. The counter 913 is set to the number of destinations on which the entry 912 depends. Here, the counter 913 is set to $11_2$ as the entry 912 is dependent on three different destinations, destinations A, B, and C. Note that even though entry 912 depends on two entries 901 and 902, the counter 913 is set to three as entry 912 depends on two destinations of entry 901 and one destination of entry 902.

As described above, the counters 905, 909, and 913 may be changed in response to selecting the entries 901 and 902. For example, in response to selecting entry 901, counter 905 may be decremented by 1 as entry 904 only depends on one destination, destination B, from entry 901. Counter 909 may also be decremented by 1 as entry 908 only depends on one destination, destination A, from entry 901, even though multiple sources 911-1 and 911-2 depend on destination A. However, counter 913 may be decremented by 2 as entry 912 depends on two destinations, destinations A and B, from entry 901.

In this embodiment, each of the entries 904, 908, and 912 depends on only one destination of entry 902, destination C. Accordingly, the counters 905, 909, and 913 may be decremented by 1 in response to selecting entry 902. However, in other embodiments, the entries 904, 908, and 912 may depend on multiple destinations of entry 902 similar to entry 901 and the corresponding counters can be changed accordingly.

Although changing the counters 905, 909, and 913 have been described in response to selecting entries 901 and 902, the counters 905, 909, and 913 may also be changed in response to cancelling the entries 901 and 902 as described above. For example, if entry 901 is cancelled, counters 905, 909, and 913 may be incremented by 1, 1, and 2, respectively. Furthermore, although incrementing and decrementing the counter have been used as examples of changing the counters 905, 909, and 913, the counters 905, 909, and 913 may be changed in different ways as described above.

In an embodiment, the sources and destinations described above may be registers of instructions. For example, destinations A-E may correspond to five different registers. Sources 907, 911, and 915 may refer to different registers. Although registers have been used as examples of the sources and destinations, other techniques may be used. For example, the sources and destinations may refer to memory locations, tags for lookup tables, other data storage locations, or the like.

Although entries 901 and 902 are illustrated as having different components than entries 904, 908, and 912, the additional components are not illustrated for simplicity. That is, entries 901 and 902 may also have counters, sources and dependency vectors, and entries 904, 908, and 912 may have destinations.

In an embodiment, the destinations and sources described above may be instruction destinations and instruction sources. For example, as described in further detail below, the memory 900 may be part of a processor or system, part of a scheduler, or the like. Accordingly, the entries may be associated with instructions and thus, the destinations and sources are destinations and sources of the corresponding instructions.

Figure 10:
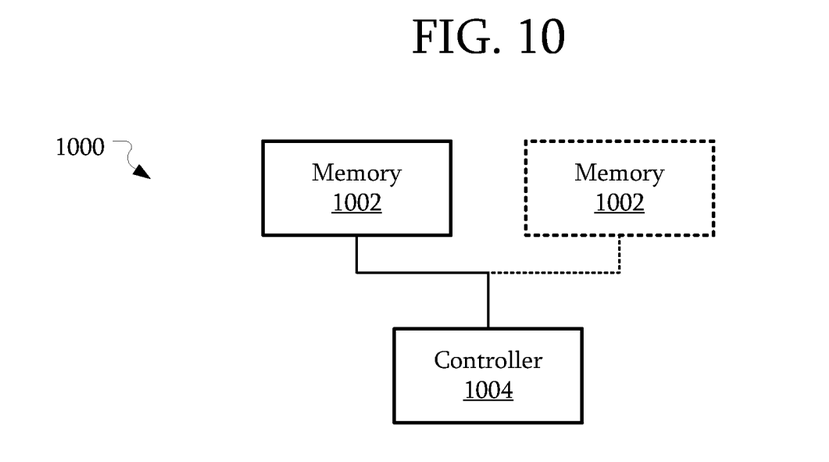
FIG. 10 is a block diagram of a computing device constructed according to an embodiment incorporating principles of the present inventive concepts.

FIG. 10 is a block diagram of a device 1000 constructed according to an embodiment incorporating principles of the present inventive concepts. In this embodiment, the memory 1002 can be configured to store multiple entries as described above similar to memory 300. Accordingly, each dependent entry can include a counter. A controller 1004 is coupled to the memory 1002. The controller 1004 can be configured to perform the operations described above. For example, the controller 1004 may be configured to change the counter associated with a dependent entry as other entries on which it depends are selected and cancelled.

As described above, multiple memories may be present. Accordingly, the controller 1004 may be coupled to one or more other memories 1002. The controller 1004 may be configured to perform the operations described above with respect to each of the memories 1002. In another embodiment, individual memories 1002 may each be coupled to a different controller 1004 (not shown).

Figure 11:
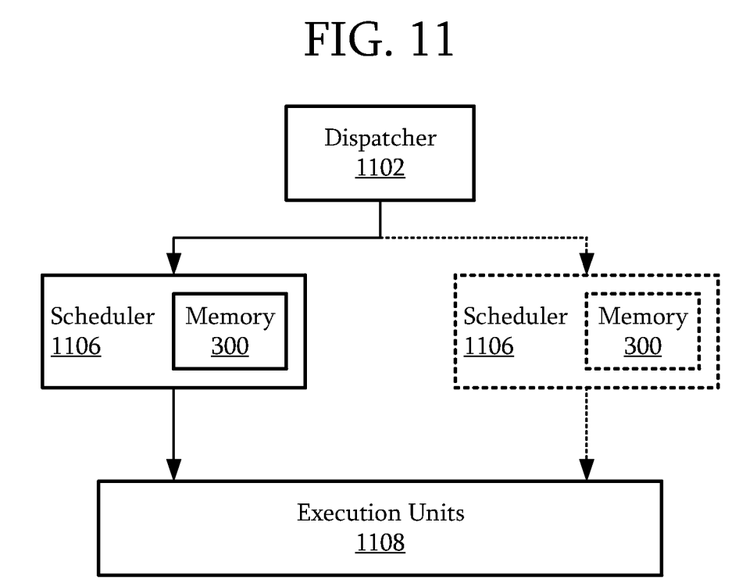
FIG. 11 is a block diagram schematically illustrating a portion of an instruction path according to an embodiment incorporating principles of the present inventive concepts.

FIG. 11 is a block diagram illustrating a portion of an instruction path according to an embodiment incorporating principles of the present inventive concepts. In this embodiment, instructions received by the dispatcher 1102 can be routed to one or more schedulers 1106. The schedulers 1106 can be configured to determine when the instructions are routed to the execution units 1108. Each scheduler 1106 may include a memory 300 as described above. The entries of the memory 300 can correspond to the instructions waiting in the scheduler 1106.

Accordingly, instructions may be selected for execution in the execution units 1108. As the instructions are selected, counters associated with any dependent instructions may be changed in a manner similar to that described above. Similarly, as instructions are cancelled in the execution units 1108, the counters associated with any dependent instructions may again be changed in a manner similar to that described above. As a result, when an instruction is cancelled, the dependency vectors of any dependent instructions need not be rebuilt as the corresponding counters of the dependent instructions are changed to reflect the as yet unresolved dependency but the dependency vectors themselves are unmodified.

In an embodiment, a system may, but need not rely on clearing the dependency bit of a dependent instruction in an dependency vector. Instead the system may decrementing a pre-loaded counter value for the dependent instruction in response to a producer wakeup. As a result, recreating the dependency if the producer cancels may be performed by rewinding the counter back to its original value. An advantage of this technique is that rebuilding the dependency vector can be relatively straight-forward and inexpensive in terms of area and power.

The system includes one or more schedulers 1106 using a scheduler entry number based matrix scheduler. In a scheduler entry number based matrix scheduling scheme a dependency vector is stored per instruction or entry in the scheduler. The vector is as wide as the depth of the scheduler 1106 and it captures all the dependencies of the instruction by setting a bit per source dependency. Here, the sources are the producer instructions. The location of the set bit indicates the entry number of the producer of the source data. Note that if all the sources of an instruction are dependent on the same producer, then there will be only 1 bit set. In other words, the number of bits set indicates the number of different producers the instruction is dependent on, rather than the number of sources which have dependency.

Using a 32 entry 1106 scheduler as an example, the 32 entry scheduler 1106 can include entries where each entry corresponds to a single instruction. Each entry will have a 32 bit dependency vector to indicate the dependencies of its sources. If the Nth bit of this 32 bit vector is set, it indicates that one or more of its sources has a dependency on the producer in entry N.

Each scheduler entry can have a pre-loaded counter whose value indicates the total number of producers that the instruction is dependent on. This count value can be generated by a pop-count of all the 32 dependency bits in the dependency vector. However the number of sources that belong to a single instruction may be in the low single digits, so a full 32 bit pop-count may not be needed. For instance, if an instruction can only have a maximum of 2 sources, then the maximum number of bits set in the dependency vector can only be 2. So in this case, instead of a pop-count we can chose to do the count using an XOR of the dependency bits and an OR of the dependency bits. If the XOR result is 1, it indicates that only 1 dependency bit is set. If the XOR result is 0, it indicates that either there are 2 dependency bits set or no dependency bits are set. To determine if it 2 bits or no bits set, we do an OR of the bits. If the result is 1 it indicates that there are 2 bits set, if the result is 0 then no bits are set. So this combination of XOR and OR gives us the effective pop-count. There maybe other ways to get the preload count value without having to do a full pop-count of all 32 bits.

When a producer wakes up the dependent source(s), then instead of clearing the dependency bit(s) the dependency counter value is decremented. When the counter value hits zero, the instruction is ready to be picked.

If a producer speculatively wakes up its dependent source(s) and then gets cancelled (due to any number of reasons such as a load miss, fault, hazard, or the like), then the dependency counter value is incremented back by 1. If multiple producers cancel at substantially the same time, then the counter value will be incremented by a value equal to the number of producers that cancelled.

In an embodiment a dependency counter per instruction may be used to keep track of the number of unique producer instructions that the consumer instruction is dependent on.

In another embodiment, at the time of instruction allocation into the scheduler 1106 the dependency counter value is set for each instruction.

In another embodiment, the dependency counter value for a dependent instruction is decremented by 1 when a producer instruction wakes up the dependent instruction.

In another embodiment, when all dependencies for an instruction are met, in other words when all the producers of that dependent instruction have generated wakeups, the dependency counter value of the instruction becomes 0 and is ready for picking.

In another embodiment, when the wakeup generated by a producer instruction was speculative and the producer instruction gets cancelled, then the dependency counter value of the dependent instruction is incremented back by 1.

In another embodiment, instruction source dependency bits are not cleared on wakeups generated by producer instructions.

In another embodiment, rebuilding of instruction dependency bits in the case of producer cancels is not required as the instruction dependency bits were never cleared, but only the counter value needs to be rebuilt.

Although the term producer has been used above with respect to various entries, the entries can, but need not produce anything. In one embodiment, a producer entry may be a producer instruction where a register stores a result of an operation. A dependent entry, or dependent instruction, may use the value of the register. In another embodiment, a first entry may merely depend on a second entry for sequencing. That is, the first entry may not need an output of the second entry, but may need to be performed after the second entry.

Figure 12:
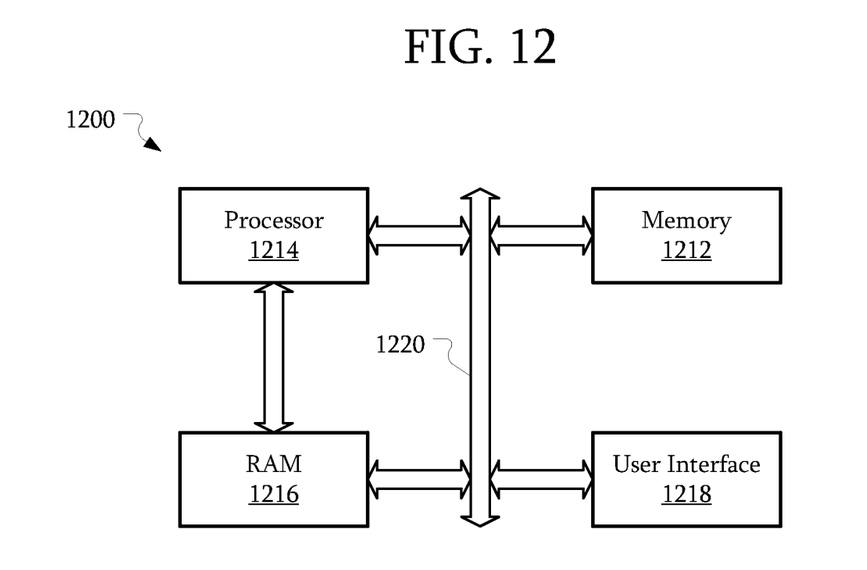
FIG. 12 is a block diagram of a computing system including a processor constructed according to an embodiment incorporating principles of the present inventive concepts.

FIG. 12 is a block diagram illustrating a system 1200 including a processor according to an embodiment incorporating principles of the present inventive concepts. The electronic system 1200 may be used for a wide variety of electronic devices such as a computer including, but not limited to, a portable notebook computer, Ultra-Mobile PCs (UMPC), Tablet PCs, a server, workstation, a mobile telecommunication device, satellite, set top box, TV and so on. For example, the electronic system 1200 may include a memory system 1212, a processor 1214, RAM 1216, and a user interface 1218, which may execute data communication using a bus 1220.

The processor 1214 may be a microprocessor or a mobile processor (AP). The processor 1214 may have a processor core (not illustrated) that can include a floating point unit (FPU), an arithmetic logic unit (ALU), a graphics processing unit (GPU), and a digital signal processing core (DSP Core), or any combinations thereof. The processor 1214 may execute the program and control the electronic system 1200. The processor 1214 may include the memories 300, 900, 1002, the controller 1004, or the like described above.

The RAM 1216 may be used as an operation memory of the processor 1214. For example, the processor 1214 or the RAM 1216 may include memories according to example embodiments described above. In an embodiment, the processor 1214 and the RAM 1216 may be packaged in a single package body.

The user interface 1218 may be used in inputting/outputting data to/from the electronic system 1200. The memory system 1212 may store codes for operating the processor 1214, data processed by the processor 1214, or externally input data. The memory system 1212 may include a memory controller and a memory.

Reference throughout this specification to "one embodiment" or "an embodiment" means that a particular feature, structure, or characteristic described in connection with the embodiment is included in at least one embodiment of the present invention.

Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Although the structures, methods, and systems have been described in accordance with exemplary embodiments, one of ordinary skill in the art will readily recognize that many variations to the disclosed embodiments are possible, and any variations should therefore be considered to be within the spirit and scope of the apparatus, method, and system disclosed herein. Accordingly, many modifications may be made by one of ordinary skill in the art without departing from the spirit and scope of the appended claims.

The invention claimed is:

1. A data processing method in a data processing system, comprising:
    changing a value of a counter associated with a first entry in response to selecting a second entry;
    comparing the value of the counter with a threshold;
    indicating that the first entry is ready to be selected in response to comparing the value of the counter with the threshold; and
    changing the value of the counter in response to cancelling the second entry;
    wherein the first entry is dependent on the second entry.

2. The data processing method of claim 1, wherein changing the value of the counter comprises decrementing the value of the counter.

3. The data processing method of claim 1, wherein the threshold is zero.

4. The data processing method of claim 1, further comprising setting the value of the counter to a number of destinations upon which the first entry depends.

5. The data processing method of claim 1, further comprising loading the counter in response to a dependency vector of the first entry.

6. The data processing method of claim 5, wherein loading the counter in response to the dependency vector of the first entry comprises:
    performing an OR operation on bits of the dependency vector;
    performing an exclusive-OR operation on the bits of the dependency vector; and
    loading the counter in response to results of the OR operation and the exclusive-OR operation.

7. The data processing method of claim 1, wherein comprising changing the value of the counter in response to cancelling the second entry comprises incrementing the value of the counter.

8. The data processing method of claim 1, wherein the counter has a width that is a minimum number of bits to represent a maximum number of destinations upon which the first entry may depend.

9. The data processing method of claim 1, wherein indicating that the first entry is ready to be selected comprises indicating that the first entry is ready to be selected without clearing entries of a dependency vector associated with the first entry.

10. A data processing device, comprising:
a memory configured to store a plurality of entries, each entry including at least a counter; and
a controller coupled to the memory and configured to:
change a value of the counter associated with a first entry of the plurality of entries in response to selecting a second entry of the plurality of entries;
compare the value of the counter with a threshold;
indicate that the first entry is ready to be selected in response to comparing the value of the counter with the threshold; and
change the value of the counter in response to cancelling the second entry;
wherein the first entry is dependent on the second entry.

11. The data processing device of claim 10, wherein the controller is further configured to change the value of the counter by decrementing the counter.

12. The data processing device of claim 10, wherein the threshold is zero.

13. The data processing device of claim 10, wherein the controller is further configured to set the value of the counter to a number of destinations of the plurality of entries upon which the first entry depends.

14. The data processing device of claim 10, wherein the controller is further configured to load the counter in response to a dependency vector of the first entry.

15. The data processing device of claim 14, wherein the controller is further configured to:
perform an OR operation on bits of the dependency vector;
perform an exclusive-OR operation on the bits of the dependency vector; and
load the counter in response to results of the OR operation and the exclusive-OR operation.

16. The data processing device of claim 10, wherein the controller is further configured to increment the value of the counter in response to cancelling the second entry.

17. The data processing device of claim 10, wherein the counter has a width that is a minimum number of bits to represent a maximum number of destination upon which the first entry may depend.

18. The data processing device of claim 10, wherein the controller is further configured to indicate that the first entry is ready to be selected without clearing entries of a dependency vector associated with the first entry.

19. A data processing system comprising:
a memory system;
a user interface; and
a processor coupled to the memory system and user interface, the processor comprising:
a memory configured to store a plurality of entries, each entry including at least a counter; and
a controller coupled to the memory and configured to:
change a value of the counter associated with a first entry of the plurality of entries in response to selecting a second entry of the plurality of entries;
compare the value of the counter with a threshold;
indicate that the first entry is ready to be selected in response to comparing the value of the counter with the threshold; and
change the value of the counter in response to cancelling the second entry;
wherein the first entry is dependent on the second entry.

20. The data processing device of claim 14, wherein the dependency vector has a only one bit for each potential entry in the memory.

21. The data processing device of claim 10, further comprising:
a second memory configured to store a second plurality of entries;
wherein the controller is further configured to move the second entry to the second memory in response to cancelling the second entry.

* * * * *